(12) United States Patent
Chew

(10) Patent No.: US 11,033,013 B2
(45) Date of Patent: Jun. 15, 2021

(54) FISHING REEL

(71) Applicant: Shimano Components (Malaysia) SDN. BHD., Johor (MY)

(72) Inventor: Chun Wee Chew, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 45 days.

(21) Appl. No.: 16/727,114

(22) Filed: Dec. 26, 2019

(65) Prior Publication Data

US 2020/0296947 A1 Sep. 24, 2020

(30) Foreign Application Priority Data

Mar. 18, 2019 (JP) .............................. JP2019-049844

(51) Int. Cl.
*A01K 89/01* (2006.01)
*A01K 89/015* (2006.01)
*A01K 89/00* (2006.01)

(52) U.S. Cl.
CPC ........ *A01K 89/0193* (2015.05); *A01K 89/006* (2013.01); *A01K 89/0183* (2015.05)

(58) Field of Classification Search
CPC .......... A01K 89/01928; A01K 89/0193; A01K 89/01929; A01K 89/011221; A01K 89/011222; A01K 89/011223
See application file for complete search history.

(56) References Cited

U.S. PATENT DOCUMENTS

| 2002/0096587 | A1* | 7/2002 | Ikuta | A01K 89/00 242/319 |
| 2003/0111569 | A1* | 6/2003 | Hitomi | A01K 89/01 242/321 |
| 2014/0312153 | A1* | 10/2014 | Hiraoka | A01K 89/01085 242/234 |
| 2015/0115088 | A1* | 4/2015 | Toma | A01K 89/01928 242/283 |

FOREIGN PATENT DOCUMENTS

JP 2010-099047 A 5/2010

* cited by examiner

*Primary Examiner* — Emmanuel M Marcelo
(74) *Attorney, Agent, or Firm* — United IP Counselors, LLC

(57) ABSTRACT

A dual-bearing reel includes a reel body, a spool shaft, a pinion gear, a collar member, a bearing, and a sealing member. The reel body includes a bearing housing. The pinion gear is rotatable about the spool shaft. The collar member is mounted on an outer peripheral surface of the pinion gear. The collar member has a large-diameter portion disposed adjacent to a tooth portion of the pinion gear in a shaft direction, and a small-diameter portion having a diameter smaller than the outer diameter of the large-diameter portion. The bearing is housed in the bearing housing and rotatably supports the pinion gear using the collar member. The sealing member is an annular member disposed in contact with the inner peripheral surface of the bearing housing and the outer peripheral surface of the large-diameter portion of the collar member.

7 Claims, 4 Drawing Sheets

FISHING REEL

CROSS-REFERENCE TO RELATED APPLICATIONS

This application claims priority to Japanese Patent Application No. 2019-49844, filed Mar. 18, 2019. The contents of that application are incorporated by reference herein in their entirety.

BACKGROUND

Technical Field

The present invention relates to a fishing reel and particularly relates to a fishing reel that includes a spool shaft, a pinion gear rotatable about the spool shaft, and a bearing that supports the pinion gear.

Background Information

In the prior art, a known fishing reel includes a lever drag mechanism that is, for example, disposed about a spool shaft and restricts rotation of the spool in a line unreeling direction. The lever drag mechanism is partly disposed inside a cover member for covering the side of the reel body having a handle. The cover member has a cylindrical boss portion including a bearing that rotatably supports a pinion gear disposed inside the boss portion. See JP 2010-099047A.

BRIEF SUMMARY

In the fishing reel according to the prior art, sea water may enter the reel body and adhere to the bearing supporting the pinion gear, which can erode the bearing and impair the rotation performance of the bearing. Grease that has been applied inside the reel body may also enter the bearing and impair the rotation performance. While a sealing member or similar component can be disposed adjacent to the bearing, the pinion gear has an uneven tooth portion that would hinder water resistance and a sufficient effect would not be achieved.

It is an object of the present invention to provide a fishing reel that can prevent a bearing supporting a pinion gear from being exposed to sea water and grease.

A fishing reel according to one aspect of the present invention includes a reel body, a spool shaft, a pinion gear, a collar member, a bearing, and a sealing member. The reel body includes a bearing housing. The spool shaft is rotatably supported by the reel body. The pinion gear is rotatable about the spool shaft. The pinion gear includes a gear body and a tooth portion formed on an outer peripheral surface of a central portion of the gear body. The collar member is a cylindrical member that is mounted on an outer peripheral surface of the pinion gear. The collar member has a large-diameter portion disposed adjacent to the tooth portion of the pinion gear in a shaft direction, and a small-diameter portion having a diameter smaller than the outer diameter of the large-diameter portion. The bearing is housed in the bearing housing in the reel body and rotatably supports the pinion gear using the collar member. The bearing has an inner rim that is in contact with an outer peripheral surface of the small-diameter portion of the collar member. The sealing member is an annular member that is disposed in contact with an inner peripheral surface of the bearing housing in the reel body and the outer peripheral surface of the large-diameter portion of the collar member.

In this fishing reel, the sealing member is disposed in contact with the large-diameter portion of the collar member disposed adjacent to the tooth portion of the pinion gear. Therefore, when sea water enters the reel body, the sealing member can effectively prevent sea water from adhering to the bearing. The sealing member can also effectively prevent grease that has been applied to the reel body from entering the bearing. In addition, because the pinion gear is supported by the bearing using the collar member, the bearing can accurately support the pinion gear.

Preferably, the outer diameter of the large-diameter portion of the collar member is larger than the diameter of a root of the tooth portion of the pinion gear. With such a configuration, the large-diameter portion and the sealing member can even more effectively prevent sea water from adhering to the bearing when sea water or grease has traveled through the tooth portion of the pinion gear.

Preferably, the pinion gear includes a mounting portion that is formed on the gear body and on which the collar member is mounted, and the outer diameter of the mounting portion is smaller than the outer diameter of the tooth portion of the pinion gear. With such a configuration, an end surface of the tooth portion of the pinion gear can restrict movement of the collar member in the shaft direction when the collar member is mounted on the mounting portion of the pinion gear.

Preferably, the sealing member has a lip portion whose thickness becomes smaller toward the large-diameter portion of the collar member. With such a configuration, the area of contact between the collar member and the sealing member is made smaller, and thus, rotation performance of the collar member can be maintained.

According to the present invention, it is possible to provide a fishing reel that can prevent a bearing supporting a pinion gear from being exposed to sea water and grease.

DETAILED DESCRIPTION

Figure 1:
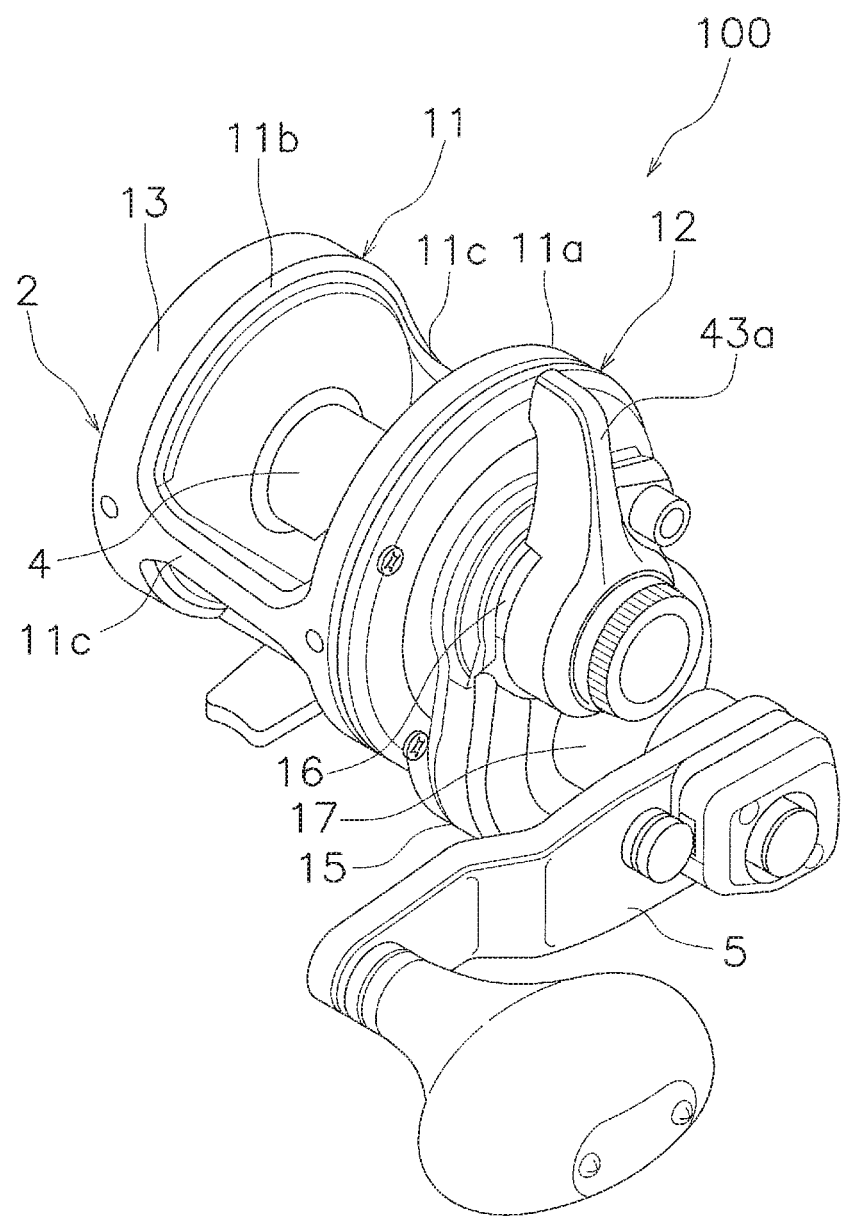
FIG. 1 is a perspective view of a dual-bearing reel.
Figure 2:
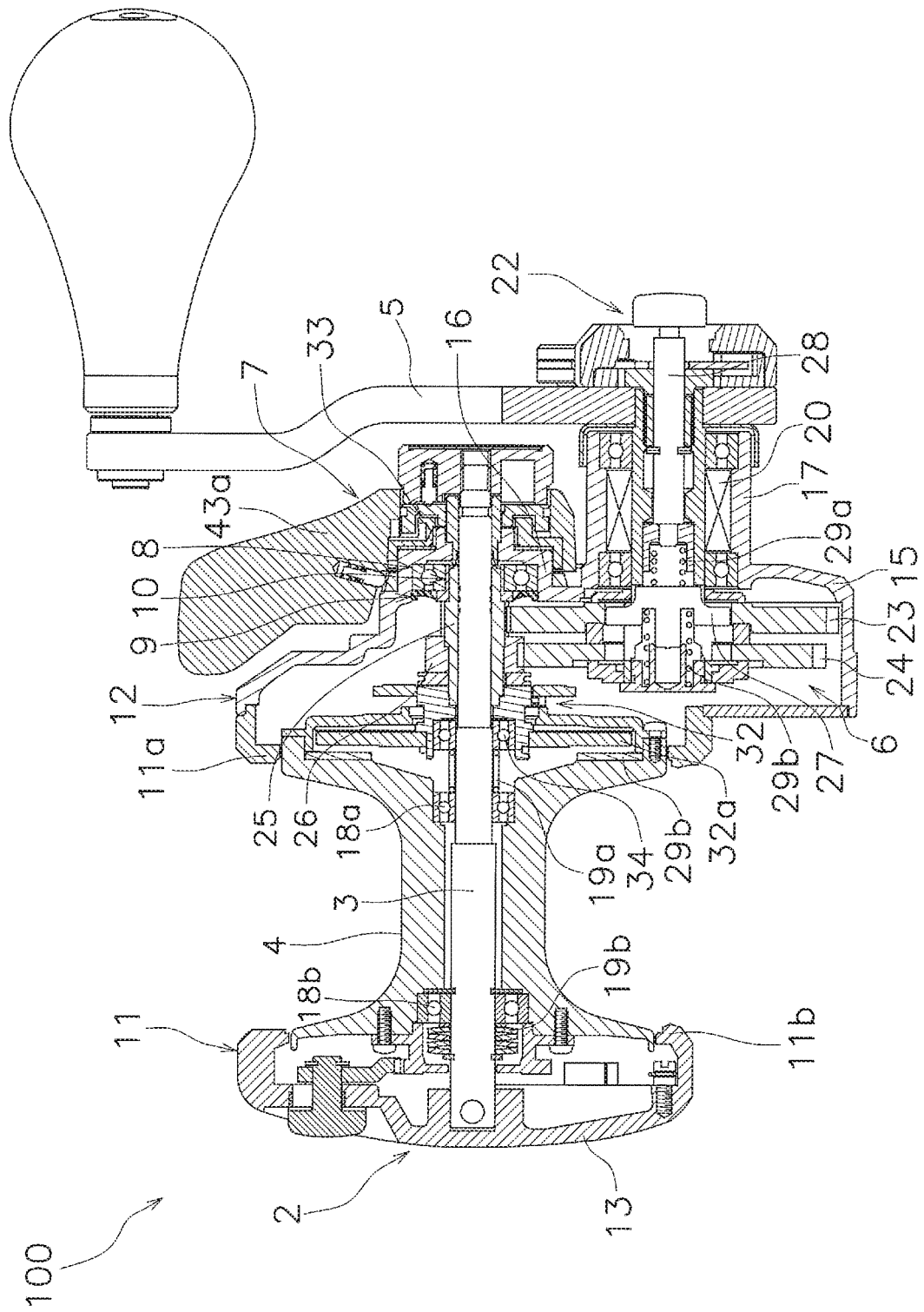
FIG. 2 is a cross-sectional view of the dual-bearing reel.

FIG. 1 is a perspective view of a dual-bearing reel (example of a fishing reel) 100 to which an embodiment of the present invention has been applied. FIG. 2 is a cross-sectional view of the dual-bearing reel 100. The dual-bearing reel 100 includes a reel body 2, a spool shaft 3, a spool 4, a handle 5, a rotation transmission mechanism 6, a lever drag mechanism 7, a collar member 8, a bearing 9, and a sealing member 10.

In the following description, the direction in which a fishing line is unreeled when fishing is referred to as the front, and the opposite direction is referred to as the rear. Left and right directions are the left and the right when the dual-bearing reel 100 is viewed from the rear. The direction in which the spool shaft 3 extends is a "shaft direction", the direction orthogonal to the spool shaft 3 is a "radial direction", and the direction about the spool shaft 3 is a "circumferential direction".

The reel body 2 includes a frame 11, a right cover 12 covering the right side of the frame 11, and a left cover 13 covering the left side of the frame 11. The frame 11 includes a first side plate 11a, a second side plate 11b arranged at an interval from the first side plate 11a in the shaft direction, and a plurality of linking members 11c linking the first side plate 11a to the second side plate 11b. The first side plate 11a and the second side plate 11b have a disk shape that includes an opening through which the spool 4 can pass. The second side plate 11b is formed integrally with the left cover 13 but can be a member independent of the left side cover 13.

The right cover 12 includes a bulging portion 15, a first boss portion 16, and a second boss portion 17. The bulging portion 15 is configured to bulge out from the first side plate 11a in both the radial and shaft directions. The bulging portion 15 is configured to bulge further forward and lower than the first side plate 11a.

The first boss portion 16 is a cylindrical portion protruding outward from the bulging portion 15 in the shaft direction. The second boss portion 17 is a cylindrical portion protruding outward from the bulging portion 15 in the shaft direction at a position lower than the first boss portion 16.

Figure 3:
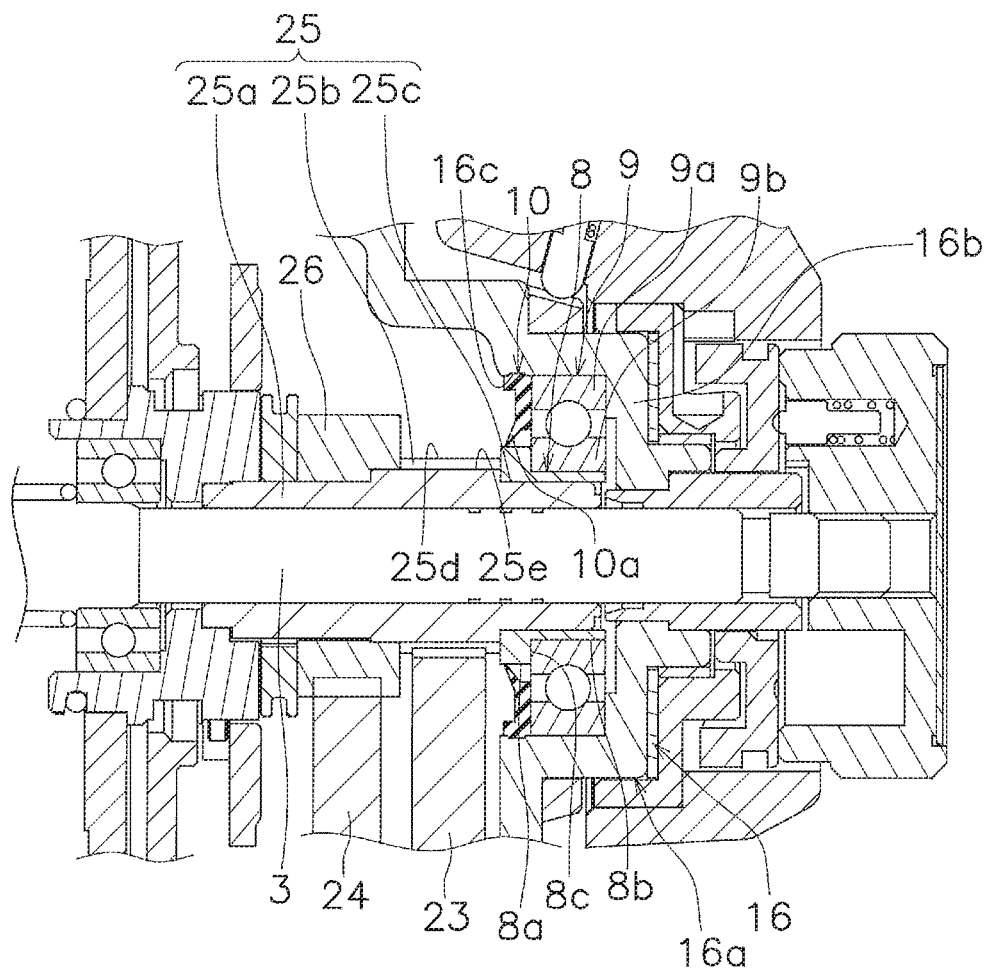
FIG. 3 is an enlarged cross-sectional view of an area around a boss portion.

FIG. 3 is an enlarged cross-sectional view of an area around the first boss portion 16. The first boss portion 16 includes a bearing housing 16a that houses the bearing 9. The bearing housing 16a includes a support portion 16b that is in contact with an outer rim 9a of the bearing 9. Outward movement of the bearing 9 in the shaft direction is restricted by the support portion 16b. A mounting groove 16c is formed on an inner circumferential surface of the bearing housing 16a. The mounting groove 16c is used for mounting the sealing member 10.

The spool shaft 3 is supported by the reel body 2 such that the spool shaft 3 can move in the shaft direction but cannot rotate. The spool shaft 3 is disposed in the reel body 2 so as to penetrate the spool 4 and the first boss portion 16 in the shaft direction.

The spool 4 is rotatably supported by the spool shaft 3 using bearings 18a and 18b, which are disposed on the outer circumference of the spool shaft 3. The bearings 18a and 18b are restricted from moving in the shaft direction by the spool 4 and biasing members 19a and 19b mounted around the spool shaft 3. The spool shaft 3 and the spool 4 are movable integrally with the bearings 18a and 18b in the shaft direction.

The handle 5 is rotatably mounted on a side portion of the reel body 2. In this embodiment, the handle 5 is rotatably mounted on the right cover 12 of the reel body 2. The handle 5 is prevented from rotating in the line unreeling direction using a one-way clutch 20 disposed inside the second boss portion 17. In a case of adopting a configuration where the handle 5 is disposed on the left of the reel body 2, the bulging portion 15 is formed on the left cover 13.

The rotation transmission mechanism 6 transmits rotation of the handle 5 to the spool 4. The rotation transmission mechanism 6 includes a gear shift operation mechanism 22. The gear shift operation mechanism 22 includes a main gear 23 used for fast winding, a second main gear 24 used for slow winding, a pinion gear 25 that meshes with the main gear 23, a second pinion gear 26 that meshes with the second main gear 24, an engagement piece 27, an operation shaft 28, and biasing members 29a and 29b. FIG. 2 illustrates a state where the engagement piece 27 is engaged with the main gear 23. The gear shift operation mechanism 22 has a similar configuration to in the prior art, and hence a detailed description thereof is omitted herein.

The pinion gear 25 is rotatable about the spool shaft 3. As illustrated in FIG. 3, the pinion gear 25 includes a gear body 25a, a tooth portion 25b, and a mounting portion 25c.

The gear body 25a is a cylindrical member extending in the shaft direction. The spool shaft 3 passes through the gear body 25a in the shaft direction. The tooth portion 25b is formed on an outer circumferential surface of a central portion of the gear body 25a and meshes with the main gear 23. The mounting portion 25c is a cylindrical member formed on one end of the gear body 25a. In this embodiment, the mounting portion 25c is formed on a right end of the gear body 25a and the collar member 8 is mounted on the mounting portion 25c. The outer diameter of the mounting portion 25c is preferably smaller than the outer diameter of a tip 25d of the tooth portion 25b. With this configuration, the tooth portion 25b can prevent the collar member 8 from moving in a direction approaching the spool 4.

The lever drag mechanism 7 restricts rotation of the spool 4 in the line unreeling direction. The lever drag mechanism 7 has a similar configuration to in the prior art, and hence only a brief description is given herein. The lever drag mechanism 7 includes a friction disk 31, a drag disk 32, and a movement mechanism 33. The friction disk 31 is a disk-shaped member that is fixed to the outer side surface of a flange of the spool 4.

The drag disk 32 is linked to the pinion gear 25 such that the drag disk 32 is rotatable integrally with the pinion gear 25. The drag disk 32 is rotatably supported by the spool shaft 3 using a bearing 34 mounted on the spool shaft 3. A backstop mechanism (not shown) disposed inside the right cover 12 prevents the drag disk 32 from rotating in the line unreeling direction. The drag disk 32 includes a restriction disk 32a that is arranged to face the friction disk 31 in the shaft direction.

The movement mechanism 33 is a mechanism for moving the spool shaft 3 in the shaft direction in response to the operation of a drag lever 43a. The drag lever 43a is swingably disposed on an outer peripheral portion of the first boss portion 16. When the drag lever 43a is operated, swinging movement of the drag lever 43a causes both the spool shaft 3 and the spool 4 to move in the shaft direction. Movement of the spool 4 causes the friction disk 31 to move in the shaft direction and alters the frictional force between the restriction disk 32a of the drag disk 32 and the friction disk 31. This adjusts the braking force that acts on the spool 4. Note that FIG. 2 illustrates a state where the restriction disk 32a of the drag disk 32 and the friction disk 31 are not in contact with each other, that is, the lever drag mechanism 7 is not restricting rotation of the spool 4.

The collar member 8 is a cylindrical member that is mounted on the outer peripheral surface of the pinion gear 25. In this embodiment, the collar member 8 is mounted on the mounting portion 25c of the pinion gear 25. The collar member 8 is fitted into the mounting portion 25c of the pinion gear 25 and integrally rotates with the pinion gear 25. As illustrated in FIG. 3, the collar member 8 includes a large-diameter portion 8a, a small-diameter portion 8b, and a step portion 8c.

The large-diameter portion 8a is an annular portion that is disposed adjacent to the tooth portion 25b of the pinion gear 25 in the shaft direction. In this embodiment, the large-diameter portion 8a is in contact with the tooth portion 25b of the pinion gear 25 in the shaft direction. The large-diameter portion 8a is disposed between the tooth portion 25b of the pinion gear 25 and an inner rim 9b of the bearing 9. The outer diameter of the large-diameter portion 8a is smaller than the inner diameter of the outer rim 9a of the bearing 9. Preferably, the outer diameter of the large-diameter portion 8a is larger than the diameter of a root 25e of the tooth portion 25b of the pinion gear 25. More preferably, the outer diameter of the large-diameter portion 8a is larger than the external shape of the tip 25d of the tooth portion 25b of the pinion gear 25. With such a configuration, the large-diameter portion 8a can minimize the occurrence of sea water flowing in a direction approaching the bearing 9 when sea water has traveled through the tooth portion 25b of the pinion gear 25.

The small-diameter portion 8b is an annular portion with a diameter smaller than the outer diameter of the large-diameter portion 8a. The step portion 8c extends in the radial direction between the large-diameter portion 8a and the small-diameter portion 8b.

The bearing 9 is housed inside the bearing housing 16a and rotatably supports the pinion gear 25 using the collar member 8. The bearing 9 is fixed inside the bearing housing 16a through, for example, press fitting. The inner rim 9b of the bearing 9 is arranged in contact with the outer peripheral surface of the small-diameter portion 8b of the collar member 8. In other words, the small-diameter portion 8b of the collar member 8 is fitted into the inner rim 9b of the bearing 9 to rotate integrally with the inner rim 9b. The inner rim 9b is in contact with the step portion 8c of the collar member 8.

The sealing member 10 is, for example, a rubber member that is elastically deformable. The sealing member 10 seals the gap between the inner peripheral surface of the bearing housing 16a and the outer peripheral surface of the large-diameter portion 8a of the collar member 8. More specifically, the sealing member 10 is an annular member that is disposed in contact with both the inner peripheral surface of the bearing housing 16a and the outer peripheral surface of the large-diameter portion 8a of the collar member 8. The sealing member 10 is disposed such that a base portion of the sealing member 10 is in contact with an end surface of the outer rim 9a of the bearing 9. The sealing member 10 is removably mounted on the mounting groove 16c of the bearing housing 16a.

The sealing member 10 preferably includes a lip portion 10a whose thickness becomes smaller toward the large-diameter portion 8a of the collar member 8. The lip portion 10a is inclined in a direction closer to the spool 4 as the lip portion 10a approaches the large-diameter portion 8a of the collar member 8. A tip edge of the lip portion 10a is disposed in contact with the large-diameter portion 8a of the collar member 8. With this configuration, the area of contact between the collar member 8 and the sealing member 10 is made smaller. Therefore, rotation performance of the collar member 8 can be maintained.

In the dual-bearing reel 100 configured as described above, the sealing member 10 is disposed in contact with both the inner peripheral surface of the bearing housing 16a and the outer peripheral surface of the large-diameter portion 8a of the collar member 8. Therefore, when sea water enters the right cover 12, the sealing member 10 can effectively prevent the sea water from adhering to the bearing 9. The sealing member 10 can also effectively prevent grease that has been applied to the reel body 2 from entering the bearing 9. Further, because the bearing 9 supports the pinion gear 25 using the collar member 8, the bearing 9 can accurately support the pinion gear 25.

OTHER EMBODIMENTS

An embodiment and a modification example of the embodiment according to the present invention have been described above, but the present invention is not limited to the above-described embodiment and modification example and can be modified within the scope of the invention. More particularly, the embodiments and modification examples described herein can be combined in any way as necessary.

In the above-described embodiment, the rotation transmission mechanism 6 includes the gear shift operation mechanism 22, but the gear shift operation mechanism 22 can be omitted. In other words, the second main gear 24 and the second pinion gear 26 can be omitted.

Figure 4:
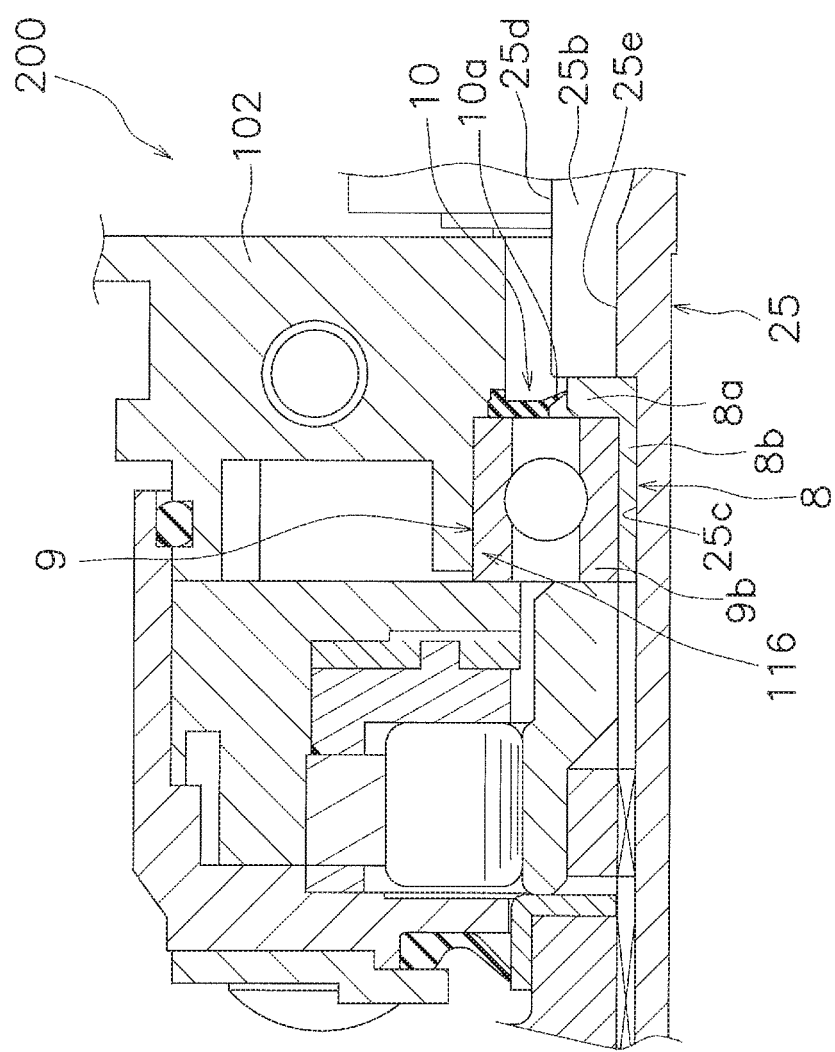
FIG. 4 is an enlarged cross-sectional view of an area around a bearing housing in a spinning reel.

In the above-described embodiment, the present invention is applied to a dual-bearing reel that includes a lever drag mechanism, but the present invention can also be applied to other types of dual-bearing reels or fishing reels such as a spinning reel. For example, as illustrated in FIG. 4, the bearing 9 that rotatably supports the pinion gear 25 using the collar member 8 can be disposed in a bearing housing 116 of a reel body 102 in a spinning reel 200, and the gap between an inner peripheral surface of the bearing housing 116 and the outer peripheral surface of the large-diameter portion 8a of the collar member 8 can be sealed using the sealing member 10. Note that the location of the bearing housing 16a or 116 is not particularly limited. For example, in the spinning reel 200, a bearing that supports a rear end of the pinion gear 25 can be sealed using the sealing member 10.

REFERENCE SIGNS LIST

2 Reel body
3 Spool shaft
4 Spool
7 Lever drag mechanism
8 Collar member
8a Large-diameter portion
8b Small-diameter portion
9 Bearing
9b Inner rim
10 Sealing member
10a Lip portion
16a Bearing housing
25 Pinion gear
25a Gear body
25b Tooth portion
25c Mounting portion
100 Dual-bearing reel (example of fishing reel)

What is claimed is:
1. A fishing reel comprising:
a reel body including a bearing housing;
a spool shaft supported by the reel body;
a pinion gear rotatable about the spool shaft, the pinion gear including a gear body and a tooth portion formed on an outer peripheral surface of a central portion of the gear body;
a cylindrical collar member mounted on an outer peripheral surface of the pinion gear, the collar member including a large-diameter portion disposed adjacent to the tooth portion of the pinion gear in a shaft direction, and a small-diameter portion having a diameter smaller than an outer diameter of the large-diameter portion;
a bearing housed in the bearing housing of the reel body, the bearing including an inner rim that is in contact with an outer peripheral surface of the small-diameter portion of the collar member, the bearing configured to rotatably support the pinion gear using the collar member; and
an annular sealing member disposed in contact with an inner peripheral surface of the bearing housing of the reel body and an outer peripheral surface of the large-diameter portion of the collar member.

2. The fishing reel according to claim 1, wherein the outer diameter of the large-diameter portion of the collar member is larger than a diameter of a root of the tooth portion of the pinion gear.

3. The fishing reel according to claim 1, wherein the pinion gear includes a mounting portion on which the collar member is mounted, the mounting portion formed on the gear body; and wherein the mounting portion has an outer diameter smaller than an outer diameter of the tooth portion of the pinion gear.

4. The fishing reel according to claim 1, wherein the sealing member has a lip portion, a thickness of the lip portion being smaller toward the large-diameter portion of the collar member.

5. The fishing reel according to claim 4, wherein the lip portion has a tip edge that is in contact with the large-diameter portion of the collar member.

6. The fishing reel according to claim 1, wherein a mounting groove is formed on the inner peripheral surface of the bearing housing, and the sealing member is removably mounted on the mounting groove.

7. The fishing reel according to claim 1, wherein the collar member further includes a step portion that extends in a radial direction between the large-diameter portion and the small-diameter portion.

\* \* \* \* \*